United States Patent [19]
Teass, Jr.

[11] 3,889,183
[45] June 10, 1975

[54] CONDUCTIVITY MEASURING CIRCUIT

[76] Inventor: Horace A. Teass, Jr., 73 Remsen St., Brooklyn, N.Y. 11201

[22] Filed: Dec. 27, 1973

[21] Appl. No.: 428,842

[52] U.S. Cl. ............................. 324/30 R; 324/30
[51] Int. Cl. ........................................... G01n 27/42
[58] Field of Search ..... 324/30 R, 30 B; 307/252 N; 317/148.5 B; 340/248 B

[56] References Cited
UNITED STATES PATENTS

| | | | |
|---|---|---|---|
| 3,029,379 | 4/1962 | Ingram | 324/30 |
| 3,278,823 | 10/1966 | Ross | 307/252 N X |
| 3,313,984 | 4/1967 | Hupp | 340/248 B X |
| 3,469,250 | 9/1969 | Voigt | 317/148.5 B X |
| 3,745,459 | 7/1973 | Cavigelli | 324/30 |

Primary Examiner—Alfred E. Smith
Assistant Examiner—Rolf Hille
Attorney, Agent, or Firm—Peck & Peck

[57] ABSTRACT

Apparatus for monitoring the conductivity of solutions having a circuitry including a conductivity cell and a meter for developing a signal voltage whose magnitude is proportional to the true conductivity of the solution, and a controller network for generating a set-point reference voltage and including means for comparing the signal voltage with the set-point reference voltage. An alarm means is responsive to the resultant sum of the signal voltage and the set-point reference voltage to indicate whether the magnitude of the signal voltage is maintained within an acceptable range of values.

6 Claims, 1 Drawing Figure

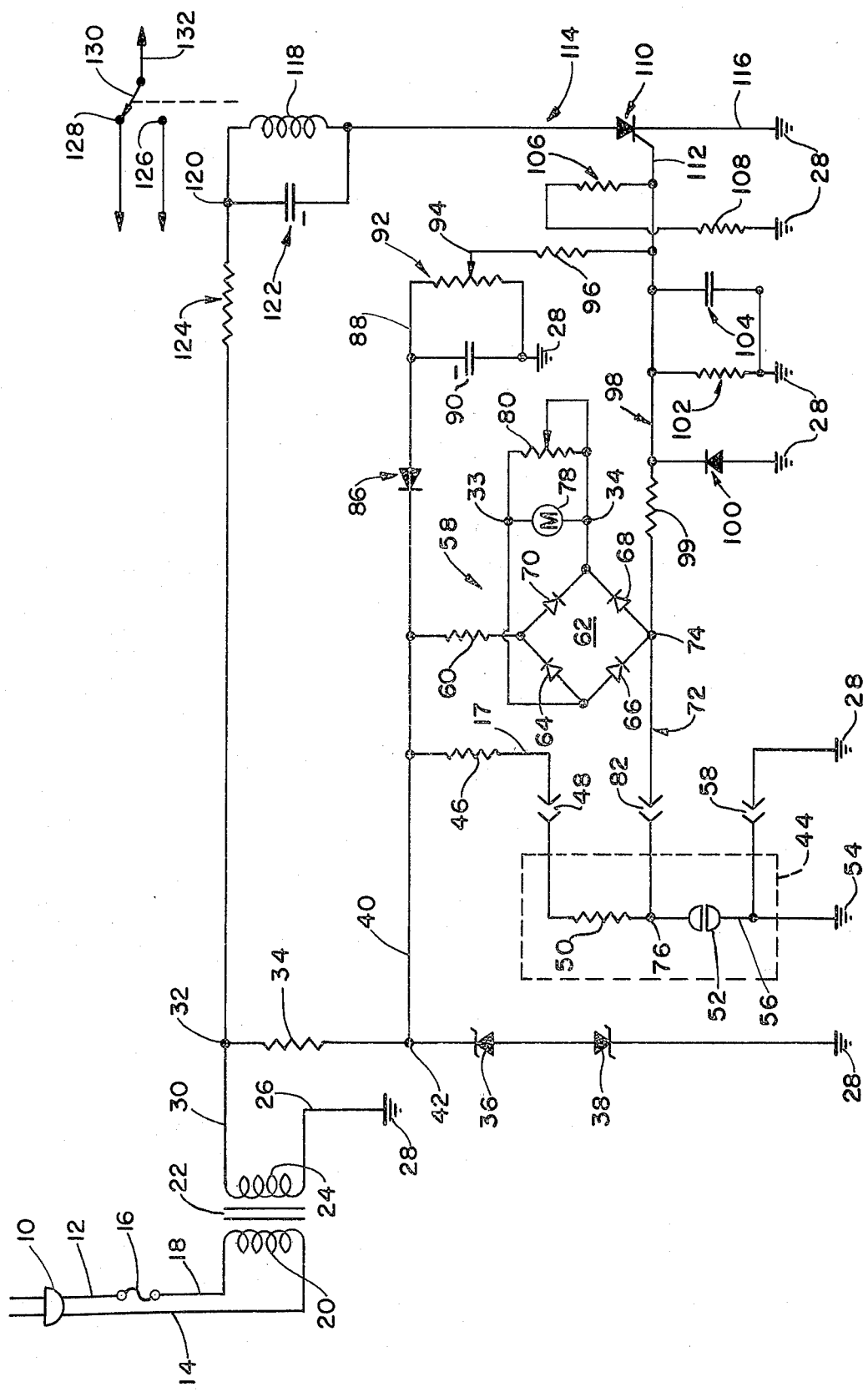

CONDUCTIVITY MEASURING CIRCUIT

BACKGROUND OF THE INVENTION

1. Field of the Invention:

The present invention relates to measuring systems and, more particularly, to a salinity or conductivity measuring system for measuring the dissolved solids or ionic content of water.

2. Description Of The Prior Art:

In many industrial situations, it is necessary to monitor water purity levels to insure that the quality of water used in a particular process meets a prescribed standard of purity. Prior salinity or conductivity measuring systems which provide for the continuous monitoring of the water purity level and the activation of an alarm when that purity level deviates from a desired standard have been found to have a number of disadvantages in their operation.

In prior art systems of this type, variation of the system's setpoint causes variation in the meter pointer and thus causes the meter to indicate incorrectly. Another problem of prior systems is that they are not capable of monitoring and providing an alarm signal in the high purity water range of the instrument. Another major difficulty encountered in prior systems was that the system's set-point trigger level was to a great degree a function of the trigger level of the system's key component. In practice this inherent trigger level was not uniform. This defect gave rise to a number of problems such as inconsistent set-point scales, drifting set-points, compressed set-point scales and, in general, differing results with the substitution of supposedly identical key components. Additionally, in some prior systems, there was too big a range between alarm "on" and alarm "off" trigger levels. A wide range between these levels caused the system to continue to dump good water after the water purity had been corrected but before the system's higher trigger "off" level was reached. On the other hand, some prior systems were so sensitive to level changes that at the borderline between acceptable and unacceptable water, the alarm relay chattered or otherwise malfunctioned. Further, in some prior systems, power line variations adversely affected not only the true meter readings, but also the system alarm level, thereby causing malfunctions. Finally, in some prior systems, only the indicator had the feature of true automatic water temperature compensation, making the overall system susceptible to errors to cause temperature variations in the various components.

SUMMARY OF THE INVENTION

Accordingly, it is an object of the present invention to provide a salinity measuring system having a convenient calibrated scale which is settable at any selected set-point in the system's range without causing the meter pointer to vary or the meter to misindicate.

It is a further object of this invention to provide a salinity measuring system having an adjustable alarm set-point feature whose operation primarily is determined not by any component of the system, but rather by the inherent functioning of the system.

It is another object of this invention to provide a salinity measuring system having a fail-safe mode of operation.

It is another object of this invention to provide a salinity measuring system having an inherent capability to isolate electrically the functional components of the system whereby adjustments in the set-point alarm level can be made without disturbing conditions in the meter and conductivity cell elements.

It is another object of this invention to provide a salinity measuring system having a non-defeatable alarming feature which is operable throughout the entire high purity range and low purity range of the system.

This invention has as another object to provide a temperature compensation feature which compensates for the internal temperature of the system's components to inhibit temperature induced variation of the alarm set-points.

The present invention is summarized in that a measuring system for monitoring salinity or conductivity of water includes a network for providing a source of regulated AC voltage, a network including a conductivity cell for developing a signal voltage whose magnitude is proportional to the true conductivity of the water and a meter for indicating the water's conductivity. A controller network receives the regulated AC voltage and develops a negative reference potential which is added to the signal voltage to produce an alarm control voltage. Excursions of the magnitude of the alarm control voltage outside of a predetermined range causes actuation of an alarm to indicate an unacceptable purity level in the monitored water.

Other objects and advantages of the present invention will become apparent from the following description of the preferred embodiment when taken in conjunction with the accompanying drawing.

BRIEF DESCRIPTION OF THE DRAWING

The drawing is a schematic diagram of the circuitry and associated apparatus of the invention.

DESCRIPTION OF THE PREFERRED EMBODIMENT

The Figure discloses a schematic diagram of the circuitry and associated apparatus of the present invention. A source of electrical power (not shown) is connected through a plug 10 to a pair of conductors 12 and 14. Conductor 12 is connected through a fuse 16 to one side 18 of a primary winding 20 of a transformer 22. The other side of primary winding 20 is connected through conductor 14 to the plug 10. The transformer 22 has a secondary winding 24; one end of winding 24 is connected through conductor 26 to circuit common or ground 28, while the other end of winding 24 is connected to conductor 30. The elements thus far described function to provide the measuring system with a proper voltage at junction 32, while isolating it from the power source.

The measuring system includes a regulated AC power section comprising a resistor 34 connected to the conductor 30 at junction 32. A pair of series connected, back-to-back zener diodes, 36 and 38, are connected in series with the resistor 34 between the conductor 30 and the circuit common 28.

A zener diode has the characteristic of conducting current heavily at a constant, predetermined voltage when its breakdown voltage is exceeded. The resistor 34 is a current limiting resistor and functions to prevent excessive current from flowing through the zener diodes, 36 and 38, when they are in a conducting state. Thus, resistor 34 and zener diodes 36 and 38 function as a voltage regulator to provide a regulated AC voltage at their predetermined voltages. This regulated AC voltage appears on the conductor 40 which is connected at the function 42 between the resistor 34 and the zener diode 36.

The measuring system includes a conductivity cell, indicated generally at 44. As is well known, the conductivity cell is immersed in the liquid which is to be monitored. The conductivity cell 44 is connected to the regulated AC voltage on conductor 40 through a resistor 46 and an input connection 48. Inside the cell 44, and also connected to the input 48, is a thermistor 50. A conductivity probe 52 is connected to the thermistor 50 on one side and to a ground 54 through a conductor 56 on the other side. The conductor 56 is also connected to circuit common 28 through an input connection 58. The conductivity probe 52 may be thought of as a variable resistance whose resistance depends upon the water's ionic content and temperature. The conductivity cell 44 comprises the thermistor 50 and the conductivity probe 52, and its operation is known to those knowledgeable in this field.

The system includes a meter or indicator section, generally shown at 58. A resistor 60 is connected by one lead to the regulated AC voltage line 40 and by its other lead to one junction of a full wave bridge rectifier 62 comprising diodes 64, 66, 68 and 70. The bridge junction between the diodes 66 and 68 is connected to a conductor 72 at point 74. The conductor 72 is connected through input connection 82 to the conductivity cell 44 output at the junction 76 between the thermistor 50 and the conductivity probe 52. A meter 78 and a potentiometer 80 are connected in parallel across the remaining two diagonals of the rectifier bridge 62. The meter 78 normally has a 0–1 milliampere scale calibration, but may be recalibrated to read in any convenient scale through adjustment of the potentiometer 80. Resistor 60 acts as a multiplying resistance. As is well known, the signal appearing at the conductivity cell output junction 76, and thus on the conductor 72, is a signal whose voltage magnitude is proportional to the true conductivity of the water. By virtue of its connection in the circuit, the meter 78 reads the difference between the regulated AC voltage on conductor 40 and the signal voltage on conductor 72. Thus, as the resistance of the cell 44 determines the AC signal voltage on the conductor 72, the meter 78 reads, in effect, this signal voltage or the water's conductivity.

The system includes a controller network which functions to permit the alarm level of the measuring system selectively to be set at any level within the instrument's range. The regulated AC voltage appears on the conductor 40, which has a diode 86 connected therein; the diode 86 is connected so as to permit only a negative voltage to appear on the conductor 88. Connected between the conductor 88 and circuit common 28 are a smoothing capacitor 90 and a potentiometer 92. The potentiometer 92 has a slidable arm 94 which is connected through a resistor 96 to the conductor 98. A diode 100 has its anode connected to the conductor 98 and its cathode connected to circuit common 28. By varying the position of potentiometer arm 94, a variable negative voltage can be presented to the resistor 96; this negative voltage constitutes a DC reference voltage. This negative, DC reference voltage is shorted through the diode 100. Except for the small forward voltage drop across the diode 100, there appears on the conductor 98 a negative reference voltage whose magnitude is controlled by the setting of the potentiometer arm 94 and which is proportional to the negative DC reference voltage presented to the resistor 96.

The controller section includes a voltage summing or adding circuit comprising the diode 100, a resistor 102 and capacitor 104 connected in parallel between the conductor 98 and circuit common 28, and thermistor 106 and resistor 108 connected in series between the conductor 98 and circuit common 28. A relatively high resistive value resistor 99 is connected between the conductor 72 and the conductor 98.

The alarm section comprises a silicon controlled rectifier (SCR) 110 having a gate 112, an anode 114 and a cathode 116. The gate 112 is connected to the conductor 98 while the cathode 116 is connected to circuit common 28. The anode 114 is connected through a relay coil 118 to the conductor 120; a smoothing capacitor 122 is connected in parallel with the relay coil 118 between the anode 114 and the conductor 120. The conductor 120 is connected through a resistor 124 to the AC voltage input conductor 30. Also shown are relay poles 126 and 128 which are connected to power suppliers (not shown) as is well known to those familiar with this art. Moveable relay arm 130 is connected to the conductor 132 which can be connected to a solenoid or other signaling device.

Considering now the operation of the system, it will be seen that the negative reference voltage generated by the controller circuit will appear on the conductor 98 and, thus, at the gate 112 of the SCR 110. This negative reference voltage inhibits the SCR from becoming conductive and provides a variable means for rendering the SCR inoperative. If the SCR were to be put into a conductive state, then DC current would flow from circuit common 28, through SCR 110, relay coil 118, conductor 120, resistor 124, conductor 30 and transformer secondary winding 24. Thus, current flow in SCR 110 would cause the relay to be actuated. In order to initiate conduction in the SCR 110, there must appear at the SCR gate 112 a positive signal having sufficient magnitude to overcome the negative reference voltage present on the conductor 98, which voltage is generated by the potentiometer set-point at 92. As will be recalled, the AC signal voltage present on the conductor 72 is proportional to the true conductivity of the monitored water. The resistor 99 passes this AC signal voltage to the conductor 98, where the diode 100 shorts the negative half-cycles to circuit common 28 while resistor 102 and capacitor 104 provide a charging circuit for the positive half-cycles to supply a positive energy signal to the SCR gate 112. The voltage adding circuit comprising the diode 100, capacitor 104 and resistors 102, 106 and 108 add together the AC signal voltage on the conductor 72 and the negative reference voltage generated by the potentiometer set-point to produce a control signal and this result: if the positive energy signal coming from the conductivity cell is greater than the negative reference voltage from the potentiometer set-point, the SCR 110 will conduct; if not, then the SCR will not conduct.

In normal operation of the measuring system, the AC signal voltage will appear on the conductor 72. If the potentiometer arm 94 is at a setting so as to allow a slightly positive voltage to be applied to the SCR gate 112, then the SCR will be in the conductive state. It will be considered normal to have the SCR in the conductive state; the relay coil 118 will be energized and "no alarm" will register. However, when the potentiometer arm 94 is adjusted so as to put an overpowering negative reference voltage on the SCR gate 112, then the SCR will not conduct and the system will be in the alarm state. Alternatively, if the positive energy signal derived from the AC signal voltage on conductor 72 should decrease and thereby be "overpowered" by the negative reference voltage generated by the set-point potentiometer 92, then the SCR 110 will go into the non-conducting state and the relay will release, causing an alarm condition.

The actual values of the components are selected so that the negative reference voltage can, through adjustment of the setting of the potentiometer arm 94, overpower any positive signal energy on the conductor 72. This provides the desirably novel means of an adjustable alarm setting system whose operation is primarily dominated, not by any key component such as the SCR, but rather by the unique combining of the positive energy signal with the negative reference voltage across a resistor-capacitor network. Thus, within family limits, the SCR can be interchanged or replaced without adversely affecting the system's operation.

The design of the measuring circuit and its manner of operation wherein the SCR 110 is normally in the conducting or on state, provide an inherent "fail-safe" mode of operation. In the event that the AC power supplied to the transformer 22 fails, then the current normally flowing through the SCR 110 and the relay coil 118 stops, causing the pole of the relay 130 to be spring driven into the alarm condition to initiate the alarm signal. Thus, should there be an interruption in the electrical power which energizes the instrument, the alarm will sound to preclude any periods when the operator erroneously believes the monitor to be functioning properly.

The novel design of the system's circuitry provides another inherent benefit in that it precludes unfavorable electrical interaction between the controller network and the meter section and conductivity cell. The electrical isolation of the controller section from the meter section and the conductivity cell is accomplished through the relatively high resistive value of the resistor 99 as compared to the low resistance and constant load presented by the diode 100 and the SCR gate 112. This circuit design enables the adjustment of the set-point potentiometer arm 94 without having that change reflected back to disturb the meter readings or the conductivity cell operation.

It is desirable to have the controller network operate effectively over the entire purity range of the instrument's design capability. Likewise, it is desirable to have automatic, non-defeatable alarming at the low purity end of the instrument's range. The novel circuitry of the present invention meets these two requirements. It will be noted that when the positive energy signal present on conductor 72 has dropped to a very low level, indicating a condition of low water purity, then with nothing more the positive voltage appearing at conductor 98 is insufficient to keep the SCR 110 conducting. This results in relay actuation, which puts the system into an alarm mode. No inadvertant operator error can defeat the manner and principle of operation, and thereby defeat the alarming safeguard. Likewise at the highest purity level in the instrument's range, there is always sufficient positive energy to operate the SCR 110 and, hence, to keep the instrument in the non-alarm mode.

The measuring system includes a temperature compensating circuit which corrects for any unfavorable effect that the internal temperature of the SCR 110 may have upon the set point of the instrument. The compensating circuit comprises theremistor 106 and resistors 102 and 108. The positive energy signal and the negative reference voltage which both appear on the conductor 98 are more or less balanced, but opposite. Thus, the shifting or resistance caused by the temperature compensating circuit equally affects both the positive energy signal and the negative reference voltage, but without effecting the set-point.

As is well known to those knowledgeable in this art, the output of the relay at 132 can be used to drive various devices such as solenoid valves, audible signals, visible signals, etc., which will clearly differentiate between alarm and non-alarm states.

Inasmuch as the present invention is subject to many variations, modifications and changes in detail, it is intended that all matter contained in the foregoing description as shown in the accompanying drawing shall be interpreted as illustrative and not in a limiting sense.

What is claimed is:

1. A circuit for monitoring the conductivity of a solution comprising:
   a negative temperature coefficient thermistor;
   a conductivity cell connected in series with said thermistor, whereby at the cell output junction formed between said thermistor and said cell there appears an AC signal voltage whose magnitude is proportional to the true conductivity of the solution to be monitored;
   a meter network connected in parallel with said thermistor and in series with said cell for indicating the true conductivity of the monitored solution;
   a control element connected in parallel with said cell and in series with said thermistor, whereby said control element receives said AC signal voltage and detects the true conductivity of the monitored solution,
   regulated AC voltage means for supplying energy to said thermistor, cell, meter network and control element;
   a control element input connecting said control element to said cell output junction;
   a reference voltage generating network connected between said AC voltage means and said control element input for generating a negative reference voltage at said control element input;
   and a voltage summing network connected between said cell output junction and said control element input for deriving a positive signal voltage from said AC signal voltage, summing said positive signal voltage and said negative reference voltage and feeding the resultant voltage to said control element input.

2. The invention recited in claim 1 wherein said control element comprises a silicon controlled rectifier having anode, cathode and gate terminals, said anode and cathode terminals being connected across said regulated AC voltage means, and said gate terminal being said control element input, whereby said negative reference voltage and said positive signal voltage are injected directly into the gate-to-cathode junction of said silicon controlled rectifier.

3. The invention recited in claim 2 wherein said reference voltage generating network comprises a diode, a capacitor, an adjustable set point potentiometer and a reference control summing resistor, said diode being connected to said regulated AC voltage means, said capacitor and said potentiometer being connected in parallel with each other and in series with said diode, and said reference control summing resistor being connected between said potentiometer set point and said gate terminal; and wherein said voltage summing network comprises a summing resistor, a diode, a resistor and a capacitor, said summing resistor being connected between said cell output junction and said gate terminal, and said diode resistor and capacitor being connected between said gate terminal and ground, whereby said diode connected between said gate terminal and ground, and the diode represented the gate-to-cathode junction of said silicon controlled rectifier constitute a pair of oppositely poled, parallel connected diodes which function with said summing resistor to electrically isolate said cell and meter from adjustments to said set point potentiometer.

4. The invention recited in claim 2 further comprising a temperature compensating network for said silicon controlled rectifier including a negative temperature coefficient thermistor and first and second fixed resistors, said termistor being connected in series with said first fixed resistor between said gate terminal and ground, and said second fixed resistor being connected between said gate terminal and ground, whereby internal temperature effects within said silicon controlled rectifier are compensated for.

5. The invention recited in claim 2 further comprising alarm means connected in circuit with said silicon controlled rectifier for indicating any change in the conductive state of said silicon controlled rectifier.

6. The invention recited in claim 1 wherein said meter network is connected to receive both said regulated AC voltage and said AC signal voltage for indicating the true conductivity of the monitored solution.

* * * * *